March 15, 1932.  H. H. McKEE  1,849,407
METHOD AND MEANS FOR MARKING MEAT
Filed April 12, 1930
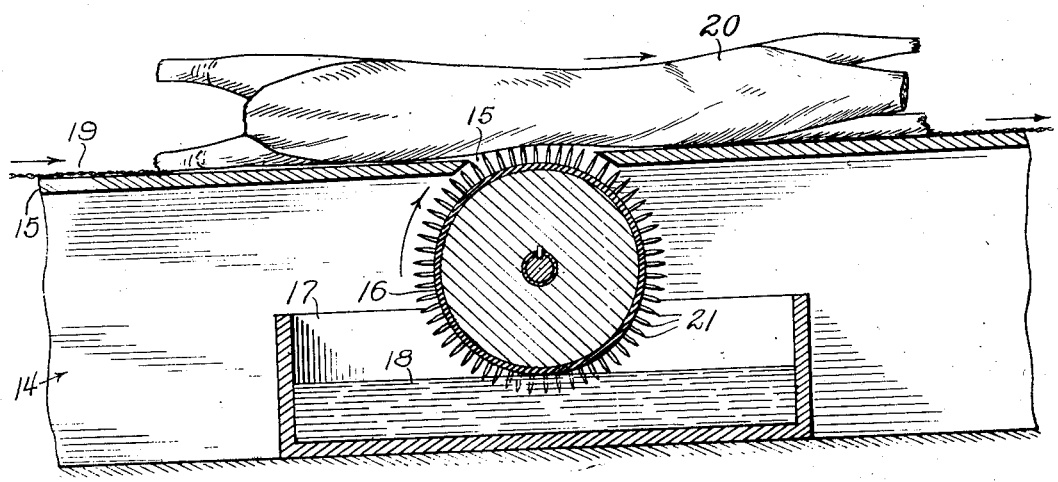
Inventor
Harry H. McKee
By Rummler, Rummler & Woodworth, Attys Patented Mar. 15, 1932

1,849,407

UNITED STATES PATENT OFFICE

HARRY H. McKEE, OF CHICAGO, ILLINOIS, ASSIGNOR TO SWIFT AND COMPANY, OF CHICAGO, ILLINOIS, A CORPORATION OF ILLINOIS

METHOD AND MEANS FOR MARKING MEAT

Application filed April 12, 1930. Serial No. 443,765.

This invention relates to the meat branding art and especially to means for subsurface pigmentation exemplified by applicant's co-pending applications Serial No. 208,668, filed July 27, 1927, and Serial No. 289,292, filed June 29, 1928.

One of the objects of this invention is to provide a meat branding machine which may be power operated. Another object is to provide a branding machine adapted for use in connection with edible animal carcasses, or wholesale parts thereof, upon which it is desired to place indicia of quality or origin. Other objects will be apparent from the description which follows.

The automatic branding machine 14 here shown comprises a table or frame 15, medially apertured at 15', a power driven rotary branding wheel 16 in operative relation to the aperture 15' and the meat on said table, a reservoir 17 containing ink 18 for said wheel, and preferably a continuous conveyor 19 of appropriate open mesh design which may be belt-like in character, as will be understood. Resilient wire mesh offers the necessary strength and accommodates operation of the branding needles therethrough.

The meat 20, such for instance as a leg of lamb or a lamb carcass or the like, or a series of such products are advanced in continuous succession over the branding wheel 16 which contains needles 21 arranged according to any desired or appropriate brand.

Where it is desired to brand such meats as lamb which are covered with fell, the needles 21 may be recessed or apertured adjacent to their tips or otherwise roughened in some suitable way in order to positively carry ink into the outer part of the meat or fat just beneath the fell, as is more particularly described in my co-pending application, filed August 3, 1931, Serial Number 554,610.

I claim:

1. The method of branding food carcasses or parts thereof which consists in causing the same to move in substantially continuous succession over and bear down gravitationally upon a rotary punctiform brand, whereby the brand is rotated and pigment is carried by appropriate brand points into the carcass and lodged beneath the skin or fell.

2. The method of punctiform branding of meats which consists in conveying the meats in successive order over a rotary marker or brand, whereby outstanding peripheral points on the brand are caused to thrust upwardly in succession through the conveyor and into the meat for discharging pigment beneath the skin or fell.

3. The method of branding food carcasses or parts thereof which consists in causing the same to move in substantially continuous succession over and bear down gravitationally upon a rotary punctiform brand, whereby the brand is rotated and pigment is carried by appropriate brand points into and below the surface of said food carcasses or parts thereof.

4. The method of punctiform branding of meats which consists in conveying the meats in successive order over a rotary marker or brand, whereby outstanding peripheral points on the brand are caused to thrust upwardly in succession through the conveyor and into the meat for discharging pigment into and below the surface of the meat.

5. The method of punctiform branding of meats which consists in conveying the meats in successive order over a rotary marker or brand, whereby outstandng peripheral marking elements on the brand are caused to thrust upwardly in succession and through the conveyor for depositing pigment into and below the surface of the meat.

Signed at Chicago this 5th day of April, 1930.

HARRY H. McKEE.